United States Patent
Jagdale et al.

(10) Patent No.: US 8,208,615 B2
(45) Date of Patent: Jun. 26, 2012

(54) CALCULATING A FULLY QUALIFIED NUMBER

(75) Inventors: Shashikant H. Jagdale, Fremont, CA (US); Krutarth M. Shah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1460 days.

(21) Appl. No.: 11/741,021

(22) Filed: Apr. 27, 2007

(65) Prior Publication Data

US 2008/0267379 A1    Oct. 30, 2008

(51) Int. Cl.
*H04M 3/42* (2006.01)

(52) U.S. Cl. ......... 379/202.01; 379/201.01; 379/203.01; 455/416

(58) Field of Classification Search ............. 379/202.01, 379/100.14, 221.01, 203.01, 204.01, 205.01, 379/201.01; 348/14.09, 14.02, 14.08; 707/10; 455/416

See application file for complete search history.

(56) References Cited

U.S. PATENT DOCUMENTS

| | | | |
|---|---|---|---|
| 5,550,909 A | 8/1996 | Chanda et al. | 379/221.14 |
| 5,694,457 A * | 12/1997 | Nixon et al. | 379/100.14 |
| 5,768,346 A | 6/1998 | Spruijt | 379/67.1 |
| 6,813,504 B2 | 11/2004 | Benchetrit et al. | 455/461 |
| 7,062,034 B2 | 6/2006 | Gibbs et al. | 379/354 |
| 7,146,158 B2 | 12/2006 | Belkin et al. | 455/414.1 |
| 2002/0122547 A1 * | 9/2002 | Hinchey et al. | 379/221.01 |
| 2007/0291108 A1 * | 12/2007 | Huber et al. | 348/14.02 |
| 2007/0294263 A1 * | 12/2007 | Punj et al. | 707/10 |
| 2008/0273079 A1 * | 11/2008 | Campbell et al. | 348/14.08 |
| 2009/0213207 A1 * | 8/2009 | Shah et al. | 348/14.09 |

* cited by examiner

*Primary Examiner* — Thjuan K Addy

(74) *Attorney, Agent, or Firm* — Baker Botts L.L.P.

(57) ABSTRACT

A teleconference server may calculate a fully qualified number (FQN), which specifies a string of numbers that, if dialed by an calling party, will establish a call with a called party. The fully qualified number may include, for example, an external access code, an international access code, a country code, a national destination code, and/or a subscriber number. In order to determine a calling party and a called party, the teleconference server may access data regarding a scheduled call. The teleconference server may determine a fully qualified number based on the relationship between the called party and the calling party. The teleconference server may send the fully qualified number to the calling party, which may then initiate a scheduled call with the called party by dialing the received fully qualified number.

25 Claims, 4 Drawing Sheets

CALCULATING A FULLY QUALIFIED NUMBER

TECHNICAL FIELD OF THE INVENTION

The present invention relates generally to telecommunications and, more particularly, to calculating a fully qualified number.

BACKGROUND OF THE INVENTION

The field of telecommunications has strived to improve the quality, reliability, and simplicity of communications. When dialing a called party, a calling party must determine an appropriate string of numbers to use in order to reach the called party. In many cases, an administrative assistant or a concierge is involved in identifying this string of numbers. This determination may be time-consuming for users, prone to errors, and often does not result in an efficient connection between the calling party and the called party.

SUMMARY

In accordance with the present invention, techniques for calculating a fully qualified number are provided. According to particular embodiments, these techniques describe a method for and apparatus operable to calculate a fully qualified number from call data regarding a scheduled call and to send the fully qualified number to a calling party so that the calling party may simply dial the fully qualified number to initiate the scheduled call.

According to a particular embodiment, a method for calculating a fully qualified number comprises identifying call data regarding a scheduled call. The call data specifies a plurality of telephony devices that are scheduled participants of the scheduled call. One or more endpoints are identified from among the telephony devices. For each of the identified endpoints: (1) a target, which is selected from among the other ones of the telephony devices, is determined for calling to participate in the scheduled call, (2) a fully qualified number is determined based upon a relationship between the identified endpoint and the target, and (3) the fully qualified number is transmitted to the identified endpoint. The fully qualified number specifies a string of numbers that, if dialed by the identified endpoint, will establish a call with the target.

Embodiments of the invention provide various technical advantages. For example, these techniques may facilitate the initiation of a scheduled call while minimizing opportunities for user error. An endpoint, after receiving a fully qualified number, may provide a speed-dial like shortcut on a user interface that allows the user to initiate a scheduled call with the push of a button. In some embodiments, calculating a fully qualified number at a centralized agent allows the central agent to select an efficient method of dialing a particular called party. For example, a calling party may dial a called party via an outside line even though both parties are located within an enterprise network, and, thus, accessible by simply dialing an extension. Using an efficient method of reaching the called party may have a variety of advantages. It may provide better call routing, improved network efficiency, and lower costs charged by external providers. Also, in particular embodiments, a network device calculates a fully qualified number and sends it to the calling party, thereby relieving a user from the responsibility of determining, remembering, and accurately dialing a number to reach a called party. Rather than using an administrative or technical assistant to determine a string of numbers to use when dialing the called party, the string of numbers may be automatically provided to the calling party, reducing resource costs and increasing efficiency. In certain embodiments, a video conferencing system supports an automatic or simplified call launch, and the video conferencing system may use these techniques to determine a fully qualified number for launching the call.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is made to the following description taken in conjunction with the accompanying drawings in which.

DETAILED DESCRIPTION OF THE DRAWINGS

Figure 1:
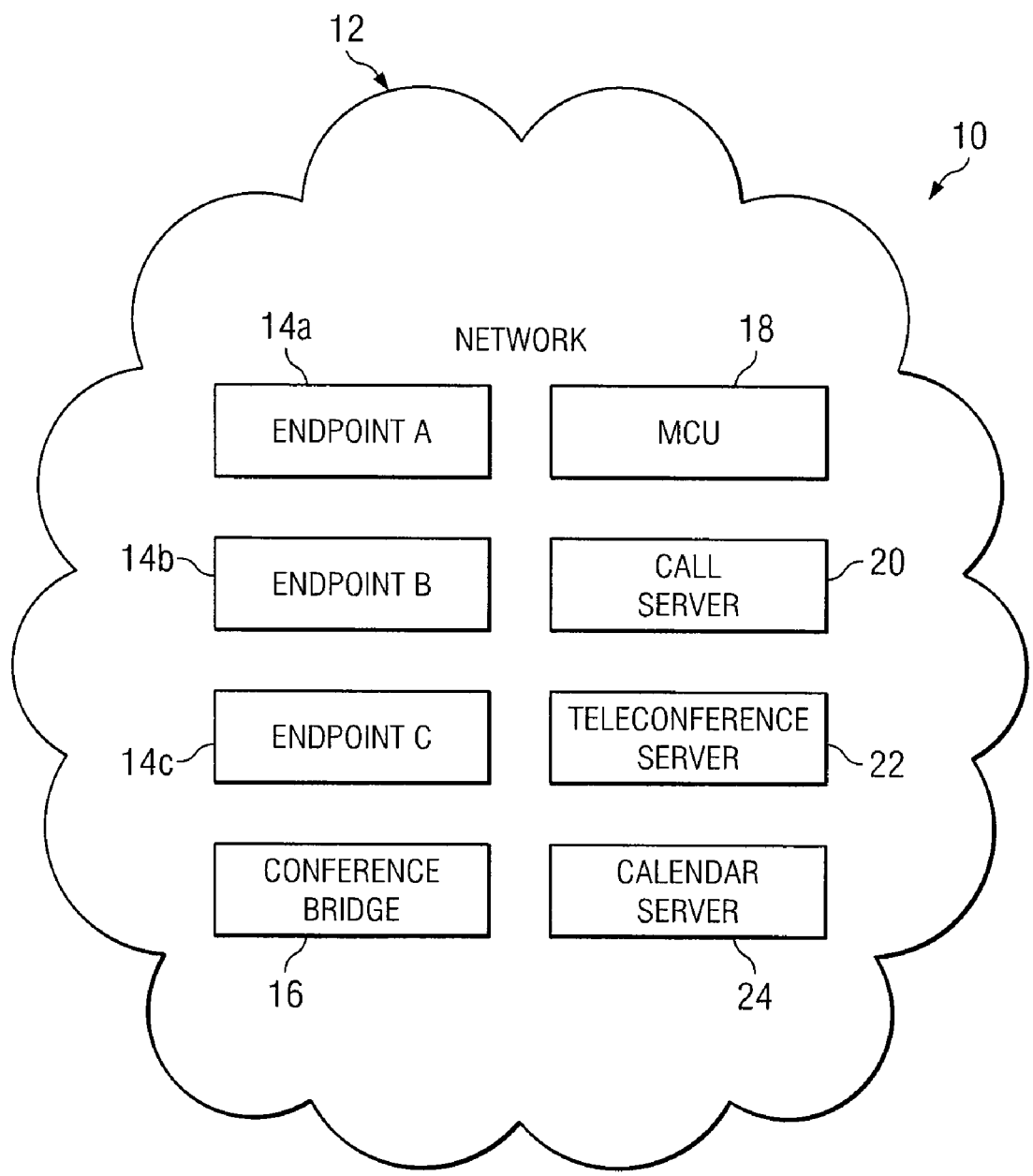
FIG. 1 illustrates a system for calculating a fully qualified number.

FIG. 1 illustrates a communications system, indicated generally at 10, for calculating a fully qualified number. As illustrated, communications system 10 includes a network 12. Network 12 includes endpoints 14, a conference bridge 16, a multipoint control unit (MCU) 18 (sometimes referred to as a multipoint conference unit), a call server 20, a teleconference server 22, and a calendar server 24. In general, elements within communications system 10 interoperate to calculate a fully qualified number from call data regarding a call and to send the fully qualified number to the calling party so that the calling party may simply dial the fully qualified number to initiate the call. The call parties (a calling party and one or more called parties) may include endpoints 14, conference bridge 16, MCU 18, and/or any other suitable devices in communications system 10. In particular embodiments, endpoints 14, which are responsible for initiating calls, may be designated as calling parties or called parties, while conference bridge 16 and MCU 18, which do not typically initiate calls, are, for the purposes of this description, designated as called parties. Elements within communications system 10 may, for each element that may be designated a calling party, calculate and send a fully qualified number to that calling party.

Network 12 facilitates communications between elements of system 10, including communications between a calling party and a called party. The communications may include a scheduled call, which may be a telephone call, a conference call, a video conference call, or any other type of communication between two parties. The communications may also include setup communications and configuration communications between elements in network 12. Network 12 represents communication equipment including hardware and any appropriate controlling logic for interconnecting elements coupled to or within network 12. Network 12 may include a local area network (LAN), metropolitan area network (MAN), a wide area network (WAN), any other public or private network, a local, regional, or global communication network, an enterprise intranet, other suitable wireline or wireless communication link, or any combination of any suitable network. Network 12 may include any combination of gateways, routers, hubs, switches, access points, base stations, and any other hardware or software that may implement any suitable protocol or communications.

Endpoints 14 represent participants in a call, for example, a video conference call. In particular embodiments, endpoints 14 are participants in a scheduled call. A user of communications system 10 may employ one of endpoints 14 in order to participate in a call. For example, one of endpoints 14 may call other endpoints 14, conference bridge 16, and/or MCU 18 and may be called by other endpoints 14, conference bridge 16, and/or MCU 18. In particular embodiments, other elements in network 12 (not illustrated) also participate in calls. As illustrated, communications system 10 includes three endpoints 14a, 14b, and 14c; however, it is understood that communications system 10 may include any suitable number of endpoints 14.

Each endpoint 14 may generate one or more audio, video, and/or data streams for use in a call. For example, endpoint 14a may generate two audio streams and two video streams, each stream conveying the sounds or image of a user participating in a call through endpoint 14a. Each endpoint 14 may also display or project one or more audio, video, and/or data streams for use in the call. For example, endpoint 14a may include two video screens each displaying an image conveyed by a received video stream and two speakers each projecting sounds conveyed by a received audio stream. Certain endpoints 14 may have different functionality than other endpoints 14. For example, endpoint 14b may generate and receive only one audio stream. In particular embodiments, one or more of endpoints 14 contain three video screens each displaying an image from a received video stream and three cameras for generating and transmitting up to three video streams.

Endpoints 14 may include any suitable communications equipment. In certain embodiments, one or more of endpoints 14 is a standard telephone set. In particular embodiments, one or more of endpoints 14 includes telepresence equipment, which may include, for example, high-end loud speakers, microphones, speaker phones, displays, cameras, and network interfaces. In general, endpoints 14 may include any suitable components and devices to participate in a call using any suitable protocol techniques or methods. For example, Session Initiation Protocol (SIP) or H.323 may be used. Additionally, endpoints 14 may support and be inoperable with other video systems supporting other standards such as H.261, H.263, and/or H.264.

In particular embodiments, endpoint 14 includes a user interface for interacting with a user. Endpoints 14 may receive a fully qualified number from teleconference server 22, may display the fully qualified number on the user interface, and may, in response to a user's instruction, dial that fully qualified number in order to initiate a call. The user interface may include a display of scheduled calls and attributes associated with those scheduled calls. In particular embodiments, endpoints 14 receive information regarding a scheduled call, including a scheduled start time, a designated subject, and/or the fully qualified number for dialing a called party. Endpoints 14 may receive this information a certain amount of time before the scheduled start of the call, e.g., endpoints 14 may receive this information two hours prior to the scheduled call. In other embodiments, an organizer of the scheduled call may specify when the endpoints 14 involved in the scheduled call should receive information and what information those endpoints 14 should receive. For endpoints 14 that receive a fully qualified number for dialing the called party, a user may initiate a call without needing to determine, remember, or accurately enter the string of numbers needed to reach the called party. As used herein, a "string" of numbers includes one or more numbers. The received fully qualified number may include this string of numbers, which may be derived by including the appropriate numbers for one or more fields. For example, the fully qualified number may be derived from the E.164 addressing scheme, which specifies which fields to use when. After one of endpoints 14 receives a fully qualified number, a corresponding user interface may include a speed-dial button programmed with the fully qualified number. This may allow a user to initiate a scheduled call by simply selecting the speed-dial button. Allowing a single action initiation of a call may enhance the user experience and reduce technical or administrative resource requirements. In certain embodiments, this speed-dial button initiates a video conference, and, by selecting the button, a user simultaneously activates the necessary video conference equipment for the video conference call.

As illustrated, communications system 10 includes conference bridge 16. Conference bridge 16 represents any suitable device or collection of devices for facilitating a call between three or more participants, e.g., endpoints 14. Conference bridge 16 may use any suitable algorithms for selecting and/or mixing media for delivery to endpoints 14 participating in a call. In some embodiments, conference bridge 16 facilitates a communication session between three or more endpoints 14 by selecting and combining individual media streams sent from endpoints 14 into one or more combined media streams. In particular embodiments, endpoints 14 dial a number corresponding to conference bridge 16 in order to connect to the call. While network 12 is shown as including one conference bridge 16, it is to be understood that network 12 may include one, many, or no conference bridges 16.

In the illustrated embodiment, communications system 10 also includes MCU 18. MCU 18 may establish a video conference, control and manage endpoints 14 during the video conference, and facilitate termination of the video conference. MCU 18 may manage which endpoints 14 participate in which video conferences and may control video, audio, and/or data streams sent to and received from managed endpoints 14. In particular embodiments, endpoints 14 dial a number corresponding to MCU 18 in order to connect to a call. While network 12 is shown as including one MCU 18, it is to be understood that network 12 may include one, many, or no MCUs 18. Further, conference bridge 16 and MCU 18 are logically depicted, and they may be combined, separated, or distributed in any suitable manner. For example, call participants may use a single element that handles both audio and video for all participants of a conference call.

Call server 20 manages communication sessions between network devices, such as a call between endpoints 14. In general, call sever 22 may coordinate the initiation, maintenance, and termination of various audio, video, and/or data communications in network 12. Call server 20 may handle signaling to support these communications and evaluate any necessary factors to establish a call. For example, call server 20 may determine whether the call requires a particular quality of service or amount of bandwidth. In particular embodiments, call server 20 is operable both to initiate scheduled calls and to receive and respond to ad hoc call setup requests from endpoints 14.

Teleconference server 22 represents a communication platform that implements functions for tracking calls, managing resources needed to support the calls, and interfacing with call server 20 to initiate the calls. Teleconference server 22 may store and maintain information regarding calls. Teleconference server 22 may also access a calendar server 24 in order to obtain information regarding scheduled calls. For example, teleconference server 22 may maintain call data for each scheduled call. The call data may identify the scheduled participants, which may include endpoints 14, conference bridge 16, MCU 18, and/or other devices in network 12, the scheduled time and duration of the call, and any resources required for the call. A user may employ calendar server 24 to schedule calls, and calendar server 24 may notify teleconference server 22 of new, modified, or deleted calls. In particular embodiments, calendar server 24 is any device that facilitates group collaboration, scheduling, and/or organizational communications. For example, calendar server 24 may be implemented by, without limitation, MICROSOFT OUTLOOK and EXCHANGE, LOTUS NOTES, ORACLE, YAHOO! Calendar, GOOGLE Calendar, and NETSCAPE COMMUNICATOR. In certain embodiments, calendar server 24 includes any suitable additional information, such as contact information associated with users of communications system 10.

Teleconference server 22 may use information regarding a call to reserve devices in network 12, such as endpoints 14, conference bridge 16, and/or MCU 18. Teleconference server 22 may determine an appropriate configuration and/or call routing for a call such as determining whether MCU 18 will manage one or more endpoints 14 and determining whether conference bridge 16 will be used to connect endpoints 14. Teleconference server 22 may modify existing reservations during the call based upon a variety of factors, such as whether all identified endpoints 14 connect to the call. Additionally, in particular embodiments, teleconference server 22 is responsible for freeing resources after a call is terminated.

Teleconference server 22 may also determine a fully qualified number to send to each possible calling party for a call. A fully qualified number may be any appropriate string of numbers that a calling party may use to dial a called party. In order to determine a fully qualified number, teleconference server 22 may maintain an FQN (fully qualified number) derivation table. In particular embodiments, the FQN derivation table may indicate international access codes, country codes, national destination codes, external access codes, enterprise network designations, extensions, and any other appropriate information. The FQN derivation table may be organized in any suitable manner. In particular embodiments, the FQN derivation table specifies each call party's characteristics, including information such as a country and region in which the call party is located and an extension specific to the call party. FQN derivation table may, based on those characteristics, provide appropriate access codes by country and region. In certain embodiments, the FQN derivation table specifies, for each individual call party, the associated access codes, dialing codes, extension, etc. Using FQN derivation table, teleconference server 22 may determine a fully qualified number to send to a calling party. A calling party may dial the fully qualified number in order to reach the called party and initiate a call. In certain embodiments, teleconference server 22 determines a fully qualified number to send to each of the call parties that are endpoints 14.

While teleconference server 22 is depicted as a single element containing a particular configuration and arrangement of modules, it should be noted that this is a logical depiction and the components and functionality of teleconference server 22 may be located at one or more physical locations. Also the functionality of teleconference server 22 may be provided by any suitable collection and arrangement of components. For example, although call server 20 and teleconference server 22 are illustrated as separate and distinct elements in communication system 10, this is simply a logical depiction and these devices may be combined, separated, or distributed in any suitable manner.

In operation, a user may schedule a call between two endpoints 14a and 14b. In particular embodiments, calendar server 24 provides a user interface with which the user can schedule the call, for example by reserving resources associated with endpoint 14a, 14b. In certain embodiments, a call can be "scheduled" shortly or even immediately before the call is initiated. During scheduling, the user may specify any suitable information about the scheduled call, such as the type of call, the particular endpoints 14 to be involved, a subject for the scheduled call, a start time and duration, etc. Teleconference server 22 may obtain certain information regarding the scheduled call and may reserve any necessary resources. These resources may include endpoint 14a, endpoint 14b, and other devices in communications system 10, e.g., MCU 18 to facilitate a scheduled video conference call. In particular embodiments, teleconference server 22 receives the necessary information from calendar server 24 after the user schedules the call.

Teleconference server 22 may determine the call parties to a call in order to calculate one or more fully qualified numbers. In this example, the call parties may be endpoint 14a and endpoint 14b. Teleconference server 22 may determine a fully qualified number for each call party, endpoint 14a and endpoint 14b. The call party receiving a fully qualified number (the calling party) may dial that fully qualified number and reach the other call party (the called party). As used herein, the terms "calling party" and "called party" are relative terms used to specify the use of a fully qualified number, and are not intended to indicate any absolute or pre-established relationship between the call parties. In particular embodiments, a pre-established relationship will exist and the calling party will be the one to initiate a call with the called party. For example, in certain embodiments, a conference bridge 16 does not initiate any calls, making it a called party that does not receive a fully qualified number.

Using an FQN derivation table, teleconference server 22 may calculate a fully qualified number for each calling party based on a relationship of the calling party to the called party. Teleconference server 22 may generate the fully qualified number by including the numbers corresponding to certain fields in the E.164 addressing scheme. Teleconference server 22, after determining which of these fields to include in the fully qualified number, may identify the appropriate number(s) to include in those field(s). For example, teleconference server 22 may determine whether an external access code is required for the fully qualified number. If the external access code is required, teleconference server 22 may identify the external access code corresponding to the calling party and place the correct external access code at the beginning of the fully qualified number. Teleconference server 22 may also determine whether an international access code and country code are required. If these fields are required, teleconference server 22 may determine the appropriate numbers to include in these fields and include these numbers in the fully qualified number.

After calculating a fully qualified number, teleconference server 22 may send the fully qualified number to the calling party. For example, teleconference server 22 may send, to endpoint 14a, a fully qualified number for dialing endpoint 14b. In addition, teleconference server 22 may send other information regarding a call to the call parties, including, for example scheduled call, a subject for the scheduled call, an organizer, and a scheduled start time. Endpoints 14a, 14b may display this information and the fully qualified number on a user interface at each of the endpoints 14a, 14b. In particular embodiments, these user interfaces allow a user at endpoints 14a, 14b to initiate a call by simply selecting a button on the user interface. This button may automatically dial the fully qualified number, similar to a speed dial, thereby simplifying the requirements imposed upon a user that wishes to begin a call. After a calling party dials a called party, call server 20 may also coordinate initiation of the call.

Particular embodiments of a system for calculating a fully qualified number have been described and are not intended to be all inclusive. While communication system 10 is depicted as containing a certain configuration and arrangement of elements, it should be noted that this is a logical depiction. The components and functionality of communication system 10 may be provided by any suitable collection and arrangement of elements that are combined, separated, and distributed as appropriate both logically and physically. For example, the functions performed by the various components of teleconference server 22 may be accomplished by any suitable devices to calculate a fully qualified number on behalf of a calling party.

Figure 2:
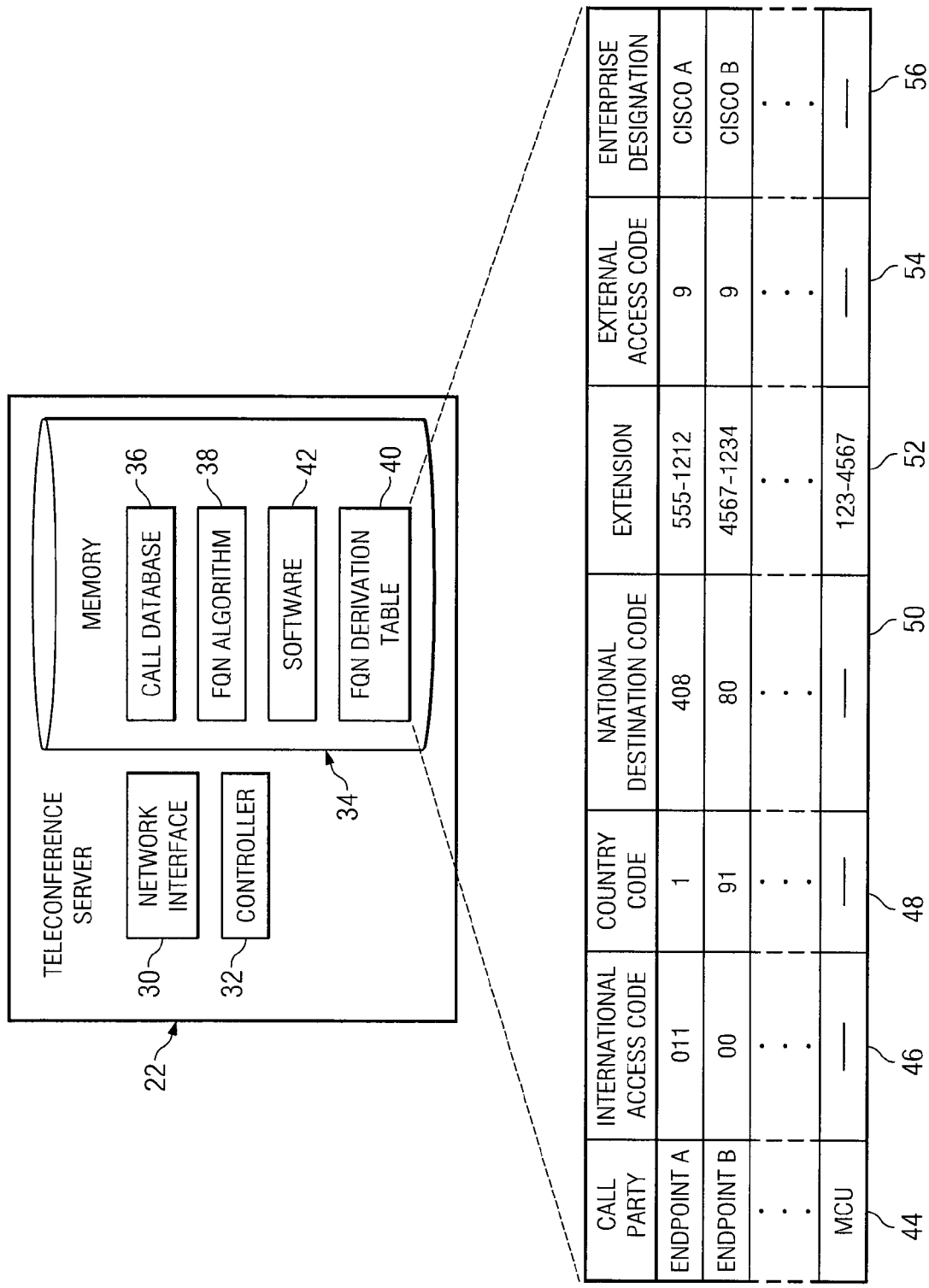
FIG. 2 illustrates a call server that calculates a fully qualified number from call data regarding a call and sends the fully qualified number to a calling party.

FIG. 2 illustrates a teleconference server, indicated at 22, that calculates a fully qualified number from call data regarding a call and sends the fully qualified number to a calling party. In the illustrated embodiment, teleconference server 22 includes a network interface 30, a controller 32, and a memory 34.

Network interface 30 supports communications with other elements of communications system 10. Network interface 30 may interface with endpoints 14, conference bridge 16, MCU 18, and call server 20. In particular embodiments, network interface 30 may comprise a wired ethernet interface. While described and illustrated as a single component within teleconference server 22, it is understood that this is a logical depiction. Network interface 30 may be comprised of any suitable components, hardware, software, and/or logic for interfacing teleconference server 22 with other elements of communications system 10 and/or network 12. The term "logic," as used herein, encompasses software, firmware, and other computer readable code that may be executed to perform operations.

In general, controller 32 controls the operations and functions of teleconference server 22. Controller 32 may process information received by teleconference server 22 through network interface 30. Controller 32 may also access and store information in memory 34 for use during operation. While depicted as a single element in teleconference server 22, it is understood that the functions of controller 32 may be performed by one or many elements. Controller 32 may have any suitable additional functionality to control the operation of teleconference server 22.

Memory 34 stores data and algorithms used by teleconference server 22. As illustrated, memory 34 includes a call database 36, FQN algorithm 38, an FQN derivation table 40, and software 42. While memory 34 is illustrated as maintaining specific information, communications system 10 contemplates memory 34 storing any suitable information to facilitate the operations of teleconference server 22.

Call database 36 includes call data regarding scheduled and pending calls. Call database 36 may include, for each call, an identification of the parties to the call, information about the call parties, a scheduled start time for the call, a scheduled duration for the call, an organizer for the call, a subject for the call, and/or any other suitable information. In particular embodiments, call database 36 includes additional information to facilitate the initiation of a call between the call parties, such as a call identifier, authentication and authorization data (e.g., pass codes, administrator codes), and participant identifiers. Teleconference server 22, accessing call database 36, may determine the call parties from the call data for a call so that one or more fully qualified numbers may be calculated.

FQN algorithm 38 stores an algorithm with which teleconference server 22 may determine a fully qualified number to send to a calling party. FQN algorithm 38 may include one or many algorithms with which teleconference server 22 can determine a fully qualified number. In particular embodiments, FQN algorithm 38 specifies the fields in the E.164 addressing scheme. In certain embodiments, FQN algorithm 38 is executed with the steps described below with respect to FIGS. 4A-B.

FQN derivation table 40 may include any suitable information from which teleconference server 22 can determine a fully qualified number. Teleconference server 22 may use FQN derivation table 40 to determine a fully qualified number based on a relationship of the calling party and the called party. In particular embodiments, FQN derivation table 40 may indicate international access codes, country codes, national destination codes, external access codes, enterprise network designations, extensions, and any other appropriate information. FQN derivation table 40 may be organized in any suitable manner. In particular embodiments, FQN derivation table 40 specifies characteristics for each potential call party, such as a country and region in which the call party is located and an extension specific to the call party. FQN derivation table may, based on those characteristics, provide appropriate access codes by country and region. In certain embodiments, FQN derivation table 40 specifies, for each known endpoint 14, the associated access codes, dialing codes, extension, etc. Teleconference server 22 uses FQN derivation table 40 to determine a fully qualified number to send to a calling party.

In the illustrated embodiment, FQN derivation table 40 includes columns specifying a call party 44, an international access code 46, a country code 48, a national destination code 50, an extension 52, an external access code 54, and an enterprise designation 56. As illustrated, the column for call party 44 includes rows corresponding to endpoint 14a, endpoint 14b, and MCU 18. The column corresponding to international access code 46 includes, for each of the call parties 44, an access code with which the corresponding call party 44, acting as a calling party, may dial a number in a foreign country. This international access code 46 may be specific to a country or area where a corresponding call party 44 is located. The column corresponding to country code 48 specifies the country code corresponding to each call party 44, acting as a called party. This country code 48 may specify the code used when dialing a number in call party's 44 country. For example, endpoint 14a may be located in the United States while endpoint 14b is located in India. In order for a calling party in the United States to dial a called party in India, a fully qualified number may include the international access code for the United States, which is "011," and the country code for India, which is "91." Likewise, for a calling party in India to dial a called party in the United States, a fully qualified number may include the international access code for India, which is "00," and the country code for the United States, which is "1." Accordingly, as illustrated for endpoint 14a, the corresponding international access code 46 is "011" and the corresponding country code 48 is "1." For endpoint 14b, the corresponding international access code 46 is "00" and the corresponding country code 48 is "91." In particular embodiments, MCU 18 may not be accessible by traditional dialing methods. Accordingly, the international access code 46 corresponding to MCU 18 may indicate that MCU 18 is not accessible by traditional dialing methods and that another algorithm should be used to calculate a fully qualified number. In the illustrated embodiments, for MCU 18 the corresponding international access code 46 and country code 48 contain no information.

National destination code 50 may specify an area code for use within a particular country. National destination code 50 may indicate a particular region of a country. For example, national destination code 50 is "408" for endpoint 14a and "80" for endpoint 14b. Extension 52 specifies a string of numbers specifically identifying the corresponding call party 44 within a particular region of a particular country. Extension 52 may correspond to a subscriber number for the corresponding call party 44. For example, extension 52 for endpoint 14a is "555-1212" and extension 52 for endpoint 14 is "4567-1234." Extension 52 may include any suitable number of digits. For example, the number of digits specified by extension 52 may correspond to the addressing used within a particular country and/or region.

External access code 54 may specify a string of numbers that a calling party dials in order to gain access to an outside line. For example, if a calling party is located within a private branch exchange, the calling party may first dial "9" before beginning to dial a number outside the private branch exchange. As illustrated, external access codes 54 corresponding to endpoint 14a and endpoint 14b are "9." Enterprise designation 56 may indicate which enterprise network, if any, is associated with a corresponding call party 44. For example, if one of call parties 44 is part of a company's private branch exchange, then an identification of that particular private branch exchange may be provided. As another example, enterprise designation 56 may specify a managing call server, such as call server 20, or other similar indication. In the illustrated embodiment, enterprise designation 56 for endpoint 14a is "CISCO A" while enterprise designation for endpoint 14b is "CISCO B." Teleconference server 22 may use enterprise designation 56 to determine whether a calling party may dial a called party using only the extension 52 corresponding to the called party. While FQN derivation table 40 is illustrated and described as having a particular configuration storing specific information, it is to be understood that this is merely for illustrative purposes. FQN derivation table 40 may comprise one or many tables, databases, files, and/or any other suitable storage method, and FQN derivation table 40 may include any appropriate information from which a fully qualified number can be calculated. In general, teleconference server 22 determines a fully qualified number based on the relationship between a calling and a called party, and FQN derivation table 40 provides information regarding this relationship.

In the illustrated embodiment, memory 34 also includes software 42. Software 42 may include any suitable programs, software, hardware, logic, or circuitry and is capable when executed to control the operation of various elements in teleconference server 22 and to perform any other functions required by teleconference server 22. Software 42 may or may not be included in teleconference server 22.

In operation, teleconference server 22 may receive call data for different calls and store that call data in call database 36. Teleconference server 22 may access call database 36 to determine call parties for a call. In particular embodiments, teleconference server 22 determines a fully qualified number for a possible calling party participating in the call. After identifying a calling party and a called party for the fully qualified number calculation, teleconference server 22 may calculate a fully qualified number to dial the called party from the calling party and may send the fully qualified number to the calling party. In order to determine the fully qualified number, teleconference server 22 may access FQN derivation table 40 and determine which ones of a number of fields should be included in the fully qualified number. In particular embodiments, these fields are specified by the E.164 addressing scheme. These fields may include an external access code, an international access code, a country code, a national destination code, and an extension. After determining which fields to include, teleconference server 22 may access FQN derivation table 40 in order to determine the appropriate number(s) to include for those fields in the fully qualified number. In certain embodiments, teleconference server 22 determines a fully qualified number that efficiently routes a call. For example, teleconference server 22 may evaluate enterprise designation 56 in order to determine whether the calling party and the called party are located within the same enterprise network, e.g., a private branch exchange for a company. If the call parties are located in the same network, then a call may be initiated by simply dialing an extension or a portion of an extension. After teleconference server 22 determines a fully qualified number, teleconference server 22 may send the fully qualified number to the calling party for use in dialing the called party.

Particular embodiments of a teleconference server 22 have been described and are not intended to be all inclusive. While teleconference server 22 is depicted as containing a certain configuration and arrangement of elements and modules, it should be understood that this is a logical depiction and the components and functionality of teleconference server 22 may be combined, separated, and distributed as appropriate, both logically and physically. Also, the functionality of teleconference server 22 may be provided by any suitable collection and arrangement of components in communication system 10.

Figure 3:
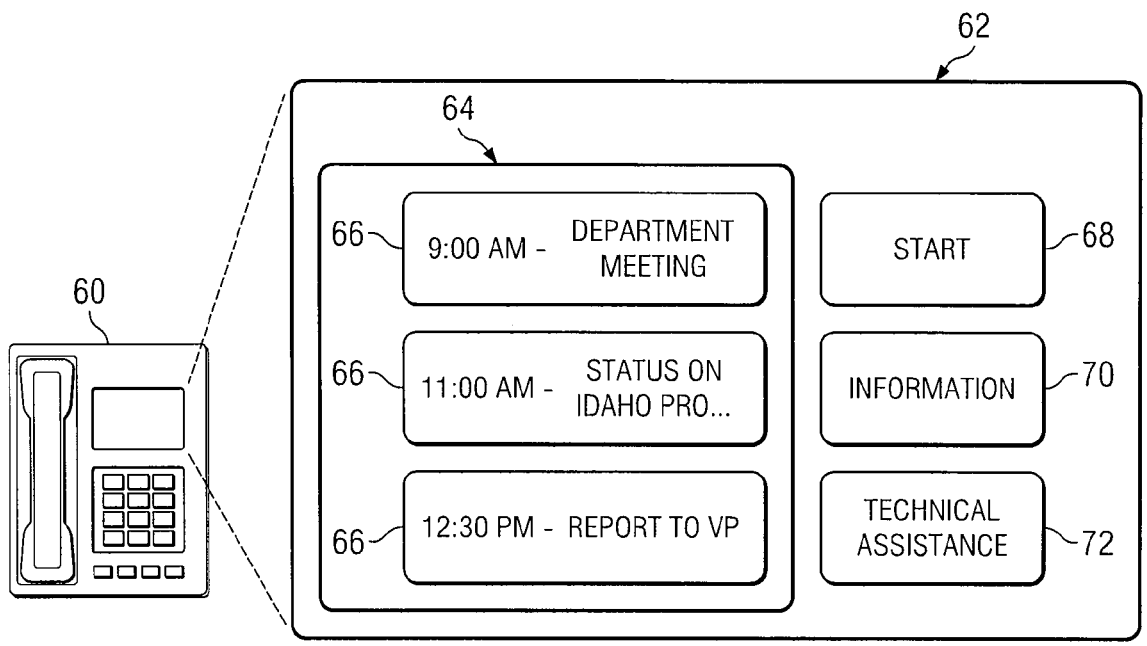
FIG. 3 illustrates an example user interface for an endpoint that receives a fully qualified number.

FIG. 3 illustrates an example user interface, indicated at 60, for an endpoint 14 that receives a fully qualified number. Endpoint 14 may receive the fully qualified number from teleconference server 22 and may use the fully qualified number to dial a called party in order to initiate a call.

As illustrated, user interface 60 includes display 62. Display 62 includes a listing 64 of one or more scheduled calls 66. Listing 64 may indicate the scheduled calls for which endpoint 14 has received information from teleconference server 22. Teleconference server 22 may send endpoint 14 any appropriate information, including a fully qualified number, for scheduled calls 66. Endpoint 14 may display any suitable information regarding these scheduled calls 66 on display 62. In listing 64, each scheduled call 66 is identified by certain descriptive attributes. For example, in the illustrated embodiment, scheduled calls 66 are identified by a start time, e.g., 9:00 AM, 11:00 AM, and 12:30 PM, and a subject, e.g., Department Meeting, Status on Idaho Project, and Report to VP. Listing 64 may include any number of scheduled calls 66 identified in any suitable way.

In particular embodiments, a user of user interface 60 may initiate a scheduled call 66 by selecting the appropriate scheduled call 66 and pressing a command button, e.g., Start 68. After Start 68 is pressed, endpoint 14 may dial the corresponding fully qualified number to begin the scheduled call. The label "Start" is used merely to identify the button, and any term or image that signifies such activity could be substituted. In particular embodiments, start 68 is a "soft key" associated with a portion of display 62. In certain embodiments, initiating scheduled call 66 establishes a video conference between the calling party and one or more called parties. As illustrated, display 62 also includes control buttons Information 70 and Technical Assistance 72. By selecting Information 70, a user may obtain additional information about one or more scheduled calls 66. A user may select Technical Assistance 72 when a problem is encountered with a scheduled call 66 in order to receive assistance.

While display 62 is illustrated as having a particular configuration, it is understood that display 62 may include any suitable number and type of controls to activate and control processes associated with scheduled calls 66. User interface 60 may remove scheduled call 66 from display 62 for a variety of reasons, including after completion of scheduled call 66, if scheduled call 66 is canceled, or if scheduled call 66 is not initiated within a preset period of time. In particular embodiments, endpoint 14 may employ security protocols to prevent unauthorized access and initiation of a scheduled call through user interface 60. Such security protocols may include any suitable measures, such as personal identification codes associated with the user(s), proximity detection of scheduled participants using radio frequency identification, or any other suitable techniques for authorizing access.

Particular embodiments of a user interface have been described and are not intended to be all inclusive. While user interface 60 is depicted as containing a certain configuration and arrangement of components, it should be noted that this is only an example, and endpoints 14 may have any suitable type of user interface 60.

Figure 4B:
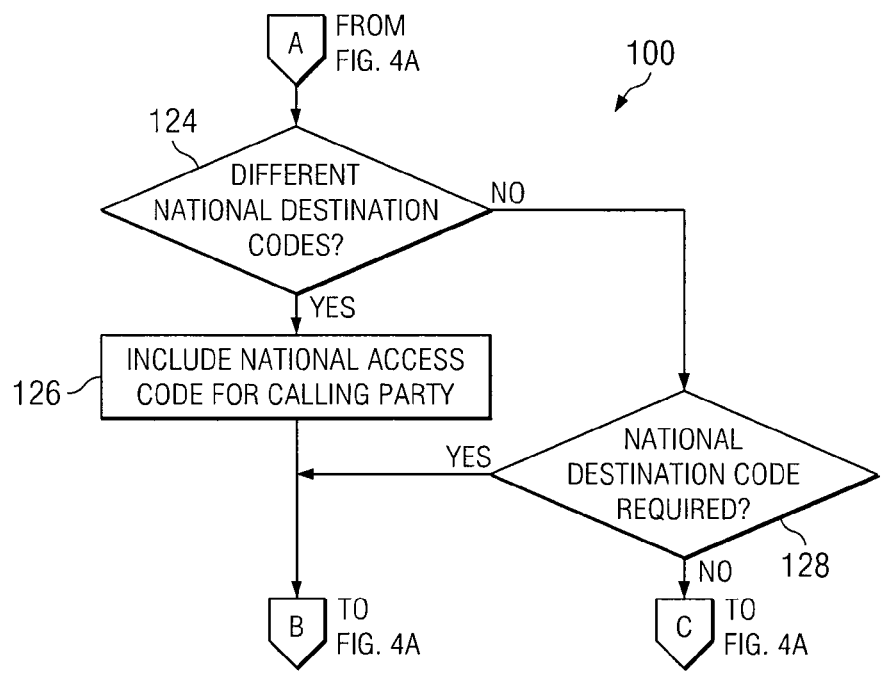
FIGS. 4A-B are a flowchart illustrating a method of calculating a fully qualified number.
Figure 4A:
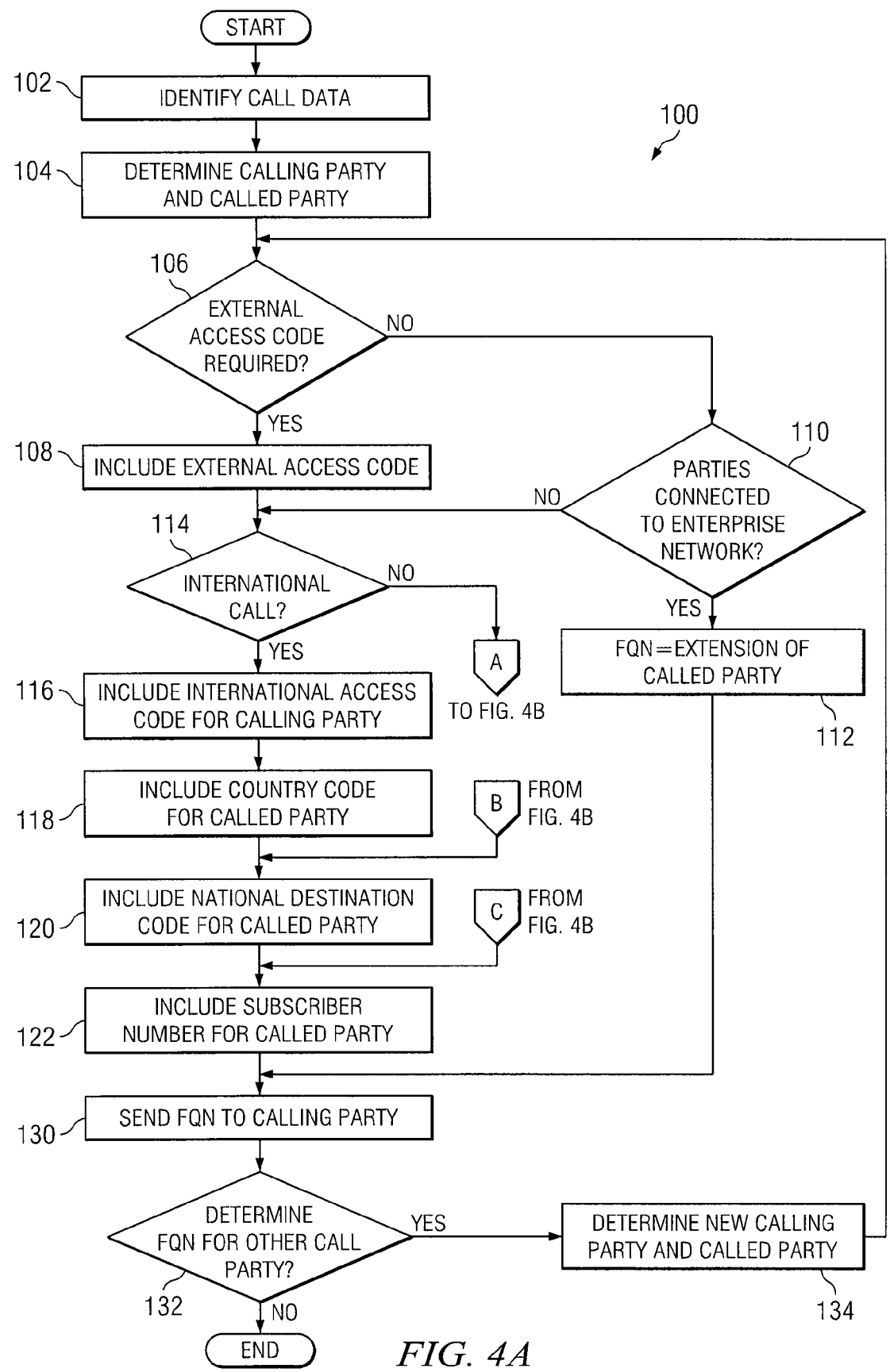

FIGS. 4A-B are a flowchart illustrating a method, indicated generally at 100, of calculating a fully qualified number. At step 102, teleconference server 22 identifies call data regarding a call from a calling party to a called party. In particular embodiments, teleconference server 22 may obtain call data from call database 36. At step 104, teleconference server 22 determines a calling party and a called party from the call data. In particular embodiments, teleconference server 22 may select a calling party from among the call parties, calculate a fully qualified number for that calling party, and repeat for each of designated the call parties that may initiate the call. Generally, teleconference server 22 may use any suitable techniques to determine a calling party and a called party from the call data.

At step 106, teleconference server 22 determines whether an external access code is required for the calling party to reach the called party. In particular embodiments, teleconference server 22 may access FQN derivation table 40 and evaluate the calling party's external access code 54. If no external access code is provided, then teleconference server 22 may determine that no external access code is needed in the fully qualified number. In certain embodiments, teleconference server 22 also accesses FQN derivation table 50 and compares enterprise designations 56 corresponding to the called party and the calling party. If those enterprise designations 56 are the same, then teleconference server 22 may determine that an external access code is not required for the call. If an external access code is needed, then teleconference server 22, in step 108, places the external access code for the calling party at the beginning of the fully qualified number. However, if no external access code is required, then teleconference server 22 determines whether the parties are connected to a common enterprise network in step 110. Teleconference server 22 may access FQN derivation table 50 and compare enterprise designations 56 corresponding to the called party and the calling party. If the call parties are part of a common enterprise network, then teleconference server 22, in step 112, determines that the fully qualified number is equal to an extension of the called party. For example, when both call parties are part of a private branch exchange run by a company, a calling party may simply dial the extension of the called party. The extension may be all or a portion of the subscriber number specified by extension 52. From step 112, method 100 proceeds to step 130. However, if, in step 110, it was determined that the parties are not connected to a common enterprise network, method 100 proceeds to step 114.

At step 114, teleconference server 22 determines whether the call is an international call. If the call is an international call, then, at step 116, teleconference server 22 adds the international access code for the calling party to the FQN string. In particular embodiments, teleconference server 22 accesses FQN derivation table 40 and identifies the calling party's international access code 46. At step 118, teleconference server 22 includes the country code for the called party in the FQN string following the international access code. In certain embodiments, teleconference server 22 accesses FQN derivation table 40 and identifies country code 48 corresponding to the called party. At step 120, teleconference server 22 includes the national destination code for the called party in the fully qualified number. In some embodiments, teleconference server 22 accesses FQN derivation table 40 and identifies national destination code 50 corresponding to the called party. At step 122, teleconference server 22 includes the subscriber number for the called party in the fully qualified number. In particular embodiments, teleconference server 22 accesses FQN derivation table 40 and identifies extension 52 corresponding to the called party. From step 122, method 100 proceeds to step 130.

If the call is not an international call (as determined at step 114), teleconference server 22 determines whether the call is between two different national destination codes in step 124. In particular embodiments, teleconference server 22 accesses FQN derivation table 40 and compares national destination codes 50 for the calling party and the called party. If the national destination codes are not equal, teleconference server 22 includes a national access code for the calling party in the fully qualified number, in step 126. For example, in the United States, the national access code is "1." From step 126, method 100 proceeds to step 120, where the national destination code for the called party is included in the fully qualified number, and then to step 122, where the subscriber number for the called party is included in the fully qualified number. However, if teleconference server 22 determines that the call parties have the same national destination code (as determined at step 124), then teleconference server 22 determines, whether a national destination code is required for the fully qualified number, in step 128. Teleconference server 22 may recognize that certain national destination codes indicate that a national destination code will be required. For example, when a calling party in Richardson, Tex. with an area code of "972" dials a called party in the same area code, the calling party must still dial "972" before the subscriber number because the area codes "214," "972," and "469" are all used for that area of the country. If teleconference server 22 determines that the national destination code is required, teleconference server 22 includes the national destination code for the called party in the fully qualified number, in step 120, and then includes the subscriber number for the called party, in step 122. If, however, the national destination code is not required, then teleconference server 22 simply includes the subscriber number for the called party, in step 122.

At step 130, teleconference server 22 sends the fully qualified number to the calling party. The calling party may then use the fully qualified number to dial the called party. At step 132, teleconference server 22 determines whether a fully qualified number should be calculated to send to other parties to the call. If not, then method 100 ends; otherwise, method

100 proceeds to step 134, where teleconference server 22 determines a new calling party and called party. For example, teleconference server 22 may swap the previous calling and called party designations. After step 134, method 100 returns to step 106 in order to determine a fully qualified number for the new calling party.

The method described with respect to FIGS. 4A-B is merely illustrative and it is understood that the manner of operation and devices indicated as performing the operations may be modified in any appropriate manner. While the method describes particular steps performed in a specific order, it should be understood that communications system 10 contemplates any suitable collection and arrangement of elements performing some, all, or none of these steps in any operable order. For example, while a particular method of calculating a fully qualified number at teleconference server 22 is disclosed, it is to be understood that any suitable device can perform these steps. Moreover, the method by which a fully qualified number is calculated may include any appropriate steps to calculate a dialable number to be used by a calling party when dialing a called party.

Although the present invention has been described in several embodiments, a myriad of changes and modifications may be suggested to one skilled in the art, and it is intended that the present invention encompass such changes and modifications as fall within the present appended claims.

What is claimed is:

1. A method for calculating a fully qualified number comprising:
    identifying call data regarding a scheduled call, the call data specifying a plurality of telephony devices that are scheduled participants of the scheduled call;
    identifying one or more endpoints from among the telephony devices; and
    for each of the identified endpoints:
        determining a target for calling to participate in the scheduled call, the target selected from among the other ones of the telephony devices;
        determining a fully qualified number based upon a relationship between the identified endpoint and the target, the fully qualified number specifying a string of numbers that, if dialed by the identified endpoint, will establish a call with the target; and
        transmitting the fully qualified number to the identified endpoint.

2. The method of claim 1, wherein determining the fully qualified number based upon the relationship between the identified endpoint and the target comprises:
    identifying two entries in an FQN derivation table, a first entry corresponding to the identified endpoint and a second entry corresponding to the target, each entry comprising a plurality of fields;
    comparing a first field in first entry to a corresponding field in the second entry; and
    based on the comparison, including one or more of the fields in the fully qualified number.

3. The method of claim 1, wherein:
    the telephony devices include a plurality of endpoints; and
    identifying one or more endpoints from among the telephony devices comprises identifying every endpoint among the telephony devices.

4. The method of claim 1, wherein:
    the scheduled call is a video conference; and
    at least one of the endpoints includes a microphone, a speaker, a camera, a monitor, and a user interface operable to display the fully qualified number.

5. The method of claim 1, wherein one of the identified endpoints dials the fully qualified number in order to initiate the scheduled call.

6. The method of claim 1, wherein at least one of the identified endpoints comprises a button programmed with the fully qualified number, the button operable to dial the fully qualified number when selected.

7. The method of claim 1, wherein determining a fully qualified number comprises:
    including an external access code in the fully qualified number, the external access code corresponding to a first string of numbers dialed by the identified endpoint in order to access an outside line;
    if the identified endpoint is not located within a country corresponding to the target, including an international access code and a country code in the fully qualified number, the international access code corresponding to a second string of numbers dialed by the identified endpoint in order to access an international number, the country code corresponding to a third string of numbers dialed to reach a country corresponding to the target;
    if the identified endpoint is not located within an area corresponding to a national destination code of the target, including the national destination code in the fully qualified number; and
    including a subscriber number corresponding to the target in the fully qualified number.

8. The method of claim 1, wherein the telephony devices include any of the following: an endpoint, a conference bridge, and a multipoint control unit.

9. A device for calculating a fully qualified number comprising:
    a memory comprising call data regarding a scheduled call, the call data specifying a plurality of telephony devices that are scheduled participants of the scheduled call; and
    a controller operable to identify one or more endpoints from among the telephony devices and, for each of the identified endpoints:
        to determine a target for calling to participate in the scheduled call, the target selected from among the other ones of the telephony devices;
        to determine a fully qualified number based upon a relationship between the identified endpoint and the target, the fully qualified number specifying a string of numbers that, if dialed by the identified endpoint, will establish a call with the target; and
        to transmit the fully qualified number to the identified endpoint.

10. The device of claim 9, wherein:
    the memory further comprises an FQN derivation table including two entries, a first entry corresponding to the identified endpoint and a second entry corresponding to the target, each entry comprising a plurality of fields; and
    determining the fully qualified number based upon the relationship between the identified endpoint and the target comprises comparing a first field in first entry to a corresponding field in the second entry and, based on the comparison, including one or more of the fields in the fully qualified number.

11. The device of claim 9, wherein:
    the telephony devices include a plurality of endpoints; and
    identifying one or more endpoints from among the telephony devices comprises identifying every endpoint among the telephony devices.

12. The device of claim 9, wherein:
   the scheduled call is a video conference; and
   at least one of the endpoints includes a microphone, a speaker, a camera, a monitor, and a user interface operable to display the fully qualified number.

13. The device of claim 9, wherein one of the identified endpoints dials the fully qualified number in order to initiate the scheduled call.

14. The device of claim 9, wherein at least one of the identified endpoints comprises a button programmed with the fully qualified number, the button operable to dial the fully qualified number when selected.

15. The device of claim 9, wherein determining a fully qualified number comprises:
   including an external access code in the fully qualified number, the external access code corresponding to a first string of numbers dialed by the identified endpoint in order to access an outside line;
   if the identified endpoint is not located within a country corresponding to the target, including an international access code and a country code in the fully qualified number, the international access code corresponding to a second string of numbers dialed by the identified endpoint in order to access an international number, the country code corresponding to a third string of numbers dialed to reach a country corresponding to the target;
   if the identified endpoint is not located within an area corresponding to a national destination code of the target, including the national destination code in the fully qualified number; and
   including a subscriber number corresponding to the target in the fully qualified number.

16. The device of claim 9, wherein the telephony devices include any of the following: an endpoint, a conference bridge, and a multipoint control unit.

17. Logic for calculating a fully qualified number, the logic encoded in media and operable when executed to:
   identify call data regarding a scheduled call, the call data specifying a plurality of telephony devices that are scheduled participants of the scheduled call;
   identify one or more endpoints from among the telephony devices; and
   for each of the identified endpoints:
      determine a target for calling to participate in the scheduled call, the target selected from among the other ones of the telephony devices;
      determine a fully qualified number based upon a relationship between the identified endpoint and the target, the fully qualified number specifying a string of numbers that, if dialed by the identified endpoint, will establish a call with the target; and
      transmit the fully qualified number to the identified endpoint.

18. The logic of claim 17, wherein determining the fully qualified number based upon the relationship between the identified endpoint and the target comprises:
   identifying two entries in an FQN derivation table, a first entry corresponding to the identified endpoint and a second entry corresponding to the target, each entry comprising a plurality of fields;
   comparing a first field in first entry to a corresponding field in the second entry; and
   based on the comparison, including one or more of the fields in the fully qualified number.

19. The logic of claim 17, wherein:
   the telephony devices include a plurality of endpoints; and
   identifying one or more endpoints from among the telephony devices comprises identifying every endpoint among the telephony devices.

20. The logic of claim 17, wherein:
   the scheduled call is a video conference; and
   at least one of the endpoints includes a microphone, a speaker, a camera, a monitor, and a user interface operable to display the fully qualified number.

21. The logic of claim 17, wherein one of the identified endpoints dials the fully qualified number in order to initiate the scheduled call.

22. The logic of claim 17, wherein at least one of the identified endpoints comprises a button programmed with the fully qualified number, the button operable to dial the fully qualified number when selected.

23. The logic of claim 17, wherein determining a fully qualified number comprises:
   including an external access code in the fully qualified number, the external access code corresponding to a first string of numbers dialed by the identified endpoint in order to access an outside line;
   if the identified endpoint is not located within a country corresponding to the target, including an international access code and a country code in the fully qualified number, the international access code corresponding to a second string of numbers dialed by the identified endpoint in order to access an international number, the country code corresponding to a third string of numbers dialed to reach a country corresponding to the target;
   if the identified endpoint is not, located within an area corresponding to a national destination code of the target, including the national destination code in the fully qualified number; and
   including a subscriber number corresponding to the target in the fully qualified number.

24. The logic of claim 17, wherein the telephony devices include any of the following: an endpoint, a conference bridge, and a multipoint control unit.

25. A system for calculating a fully qualified number comprising:
   means for identifying call data regarding a scheduled call, the call data specifying a plurality of telephony devices that are scheduled participants of the scheduled call;
   means for identifying one or more endpoints from among the telephony devices; and
   for each of the identified endpoints:
      means for determining a target for calling to participate in the scheduled call, the target selected from among the other ones of the telephony devices;
      means for determining a fully qualified number based upon a relationship between the identified endpoint and the target, the fully qualified number specifying a string of numbers that, if dialed by the identified endpoint, will establish a call with the target; and
      means for transmitting the fully qualified number to the identified endpoint.

* * * * *